United States Patent [19]
Iwata

[11] Patent Number: 5,416,771
[45] Date of Patent: May 16, 1995

[54] SIGNALING METHOD FOR PACKET NETWORK AND SYSTEM

[75] Inventor: Atsushi Iwata, Tokyo, Japan

[73] Assignee: NEC Corporation, Tokyo, Japan

[21] Appl. No.: 172,645

[22] Filed: Dec. 23, 1993

[30] Foreign Application Priority Data

Dec. 25, 1992 [JP] Japan .................... 4-344990

[51] Int. Cl.[6] .................... H04J 3/26; H04L 12/56
[52] U.S. Cl. .................... 370/60; 370/79; 370/94.1; 370/110.1
[58] Field of Search .................... 370/14, 17, 54, 60, 370/60.1, 68.1, 94.1, 94.2, 79, 80, 110.1; 379/93, 94, 220, 229

[56] References Cited

U.S. PATENT DOCUMENTS

| | | | |
|---|---|---|---|
| 5,029,164 | 7/1991 | Goldstein et al. | 370/79 X |
| 5,067,123 | 11/1991 | Hyodo et al. | 370/60 X |
| 5,289,579 | 2/1994 | Punj | 370/94.1 X |
| 5,291,481 | 3/1994 | Doshi et al. | 370/79 X |

OTHER PUBLICATIONS

"Draft Text for Q.93B", pp. 1–72, Study Group XI/-Working Party XI/6, of CCITT held in Geneva Jun. 22 to 26, 1992.

*Primary Examiner*—Melvin Marcelo
*Attorney, Agent, or Firm*—Ostrolenk, Faber, Gerb & Soffen

[57] ABSTRACT

A method which achieves a reduction of the virtual channel connection delay time in signaling without using permanent virtual channels (PVC) and without performing wasteful allocation of signal bandwidth. When a transmission terminal transmits a packet, a packet transmission control section requests transmission of a signaling packet to a signaling transmission section. The signaling transmission section searches a VC and signal bandwidth table and sends out, when a virtual channel is registered and a required signal bandwidth is provided, a packet using the virtual channel. When the signal bandwidth is insufficient, it requests from the packet switching system only a sufficient signal bandwidth and then sends out the packet. When no virtual channel is registered, the signaling transmission section requests a signaling packet from the packet switching system. The table includes, for each destination address, a virtual channel timer for releasing the virtual channel applied thereto after the virtual channel is held for a predetermined period of time after completion of transmission, and a bandwidth timer for reducing the signal bandwidth after each predetermined interval of time after the completion of transmission. At each end of a packet transmission, the two timers are reset to a clock.

5 Claims, 5 Drawing Sheets

FIG. 4
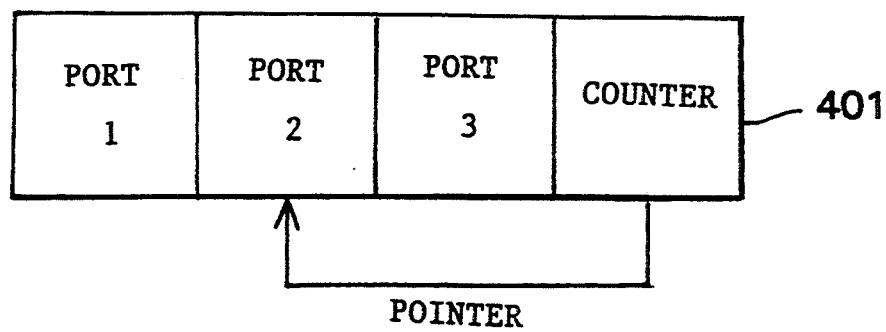
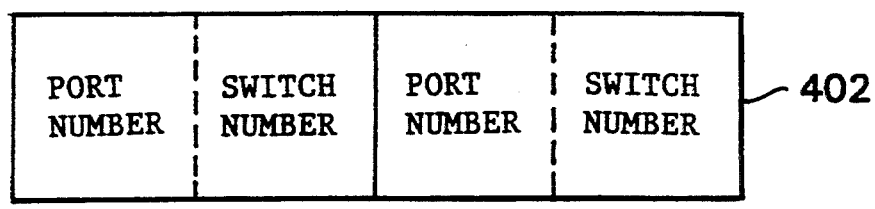
ROTATION
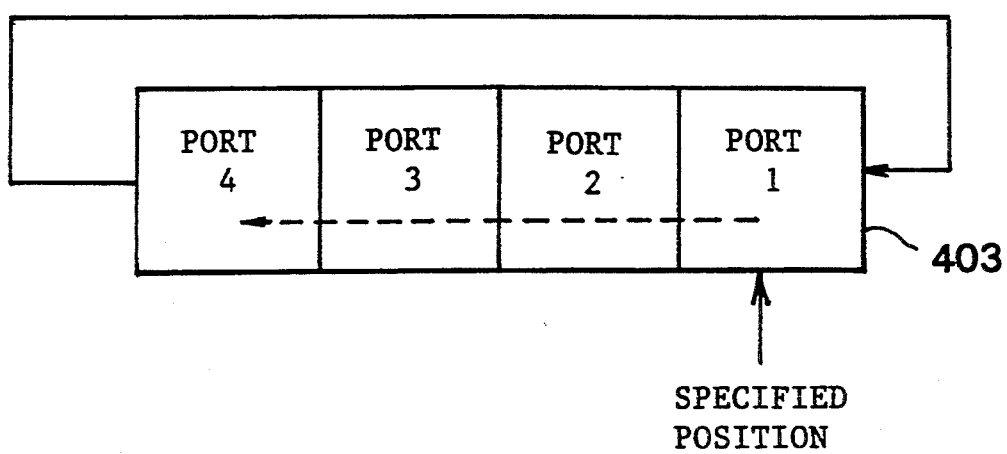

SIGNALING METHOD FOR PACKET NETWORK AND SYSTEM

BACKGROUND OF THE INVENTION

1. Field of the Invention

This invention relates to a signaling system for a connection oriented packet network, and more particularly to a high speed connection setup/release signaling system.

2. Description of the Related Art

Conventionally, the controling procedure of connection setup/release between a source terminal and a destination terminal on a connection oriented packet network, that is, a signaling system, is constituted in order to accommodate a connection oriented terminal of a low function such as the telephone set. Accordingly, a large number of complex signaling messages to be communicated is complicated to process. Consequently, such a signaling system is not suitable for a high speed connection setup. When a connectionless terminal such as a computer is accommodated while using the signaling procedure as is, the connection setup delay time causes a serious problem in applications requiring a fast response.

A complicated controlling procedure is disclosed in "Draft Text for Q.93B", pp. 1–72, which is a draft for standardization from the Working Party XI/6 in Study Group XI of CCITT held in Geneva June 22 to 26, 1992.

In the draft for standardization, it is determined that signaling is performed by the exchange of messages, including six messages including SETUP for establishing connection, three messages including Disconnect for cancelling connection, and three messages including Status as other messages. The structure of the messages includes common portions including a protocol identifier, a call number and a type of message, and special information factors for the individual messages.

In the conventional signaling system, since a virtual channel (VC) is setup and released each time an application, packet transmission or burst transmission is started and ended, when an application is started and ended frequently like an interactive connectionless packet, the time required to connect and disconnect the VC becomes longer than the time during which data are transferred. In particular in the communication of a packet to the same destination, the VC to the same destination must be setup/released frequently.

Information factors of the setup message for establishing connection in Q.93B employ, in order to designate the called party to be connected, a traffic descriptor for a signal bandwidth, necessary for communication using a called party number and a called party subaddress. Since each exchange can only perform signaling for a hop-by-hop routing wherein it examines the called party number and the traffic descriptor in a received setup message to determine a certain next route having a necessary signal bandwidth and performs, after arriving at the object of the called party address, signaling with the called party subaddress, when a plurality of stages of switches are involved, much time is required for processing of routing selection at each of the switching systems. Consequently, there is a drawback in that the end-to-end VC setup time is long.

Further, in Q.93B, since a terminal performs, when it is in a connection setup phase, acquisition of a VC for transmission and acquisition of an end-to-end communication route by way of communication of the six messages including Setup, the processing delay time and the propagation delay time cannot be ignored even when a small amount of data is communicated.

Accordingly, in order to achieve setup signaling quickly, instead of a countermeasure wherein a VC is allocated on demand by the switching system for each transmission of a packet, signaling wherein the terminal itself has some VCI(VC Identifier) initially and can select a VC without interaction with the switching system is required.

SUMMARY OF THE INVENTION

It is an object of the present invention to provide a high speed signaling method for a connection oriented packet network which solves the problem of the long connection delay time owing to the conventional signaling of Q.93B of the CCITT standardization draft.

In order to attain the object described above, according to a first aspect of the present invention, there is provided a signaling method for VC connection setup/release on a connection oriented packet network, in which each terminal acquires the logical channel (VC) to transmit a packet to a packet switching system (described as "packet switch" hereinafter) and the packet switch sets up a VC corresponding to the request for transmission of the packet and notifies the terminal of the VCI, the signaling method comprising the steps of:

recording, by the terminal, the VCI provided notified from the packet switch and transmitting a message packet to the destination terminal by way of the VC, holding, after the end of the transmission of the message packet, the VC for a predetermined period of time;

searching for the VC when the terminal tries to transmit the next message packet; and transmitting, when the VC remains, the packet through the VC and;

performing, when the terminal confirms that the VC does not remain, signaling to acquire the logical channel to transmit the next packet to the packet switch.

Accordingly, since a VC is held for a predetermined period of time even after the end of the transmission of a packet to a certain called party is completed, when a request for transmission of a packet to the same address occurs, the existing VC can be used as is, and accordingly, the time otherwise required for signaling can be omitted.

It is a second object of the present invention to provide a system which realizes the signaling method of the first object, and in order to attain the second object, there is provided a signaling system for VC connecion setup/release on a connection oriented packet network in which each terminal acquires the VC to transmit a packet to a packet switch and the packet sets up a VC having a signal bandwidth corresponding to the request for transmission and notifies the terminal of the VCI, the signaling system comprising:

each terminal including a VC disconnection timer for disconnecting the VC provided to the terminal after a predetermined period of time after the end of the transmission through the VC;

a signal bandwidth timer for successively decreasing the signal bandwidth on the held VC as the unused time duration of the held VC increases;

VC holding and indicating table means for recording the held VC provided thereto during each holding time;

means for searching, when a packet transmission is required, the table and transmitting, when it is confirmed that the VC to the same called party terminal is held with holding a necessary signal bandwidth, the packet using the VC;

means for performing, when the search reveals that the VC to the same called party terminal is held but a necessary signal bandwidth is not held, signaling to provide a request to the packet switch to provide the necessary signal bandwidth only; and means for performing, when the search reveals that no VC to the same called party terminal is detected, signaling to provide a request to the packet exchange to provide the necessary VC and signal bandwidth.

It is a third object of the present invention to achieve reduction of the routing time at each switching point. In order to attain this object, according to the present invention, there is provided a signaling system for VC connection setup/release on a connection oriented packet network in which each terminal acquires the VC to transmit a packet to a packet switch and the packet switch sets up a VC having a signal bandwidth corresponding to the request for transmission and notifying the terminal of the VCI, the signaling system comprising:

the packet switch including means for notifying the terminal, when signaling to request transmission of a packet is received of, a routing path from a source terminal to the destination terminal by performing hop-by-hop routing using the address of a called party terminal included in the signaling from the terminal;

each terminal comprising a virtual channel and a routing path table for storing a VC to the called party address already held and the routing path of the held VC received from the packet switch when there is no held channel for a predetermined period of time after the end of the transmission through the VC;

each terminal further comprising means for searching, when a packet is to be transmitted, the VC and the routing path table, sending out the packet to the VC when a VC corresponding to the called party address is detected, performing, when a VC is not existing but the routing path to the called party terminal address is detected, the signaling with the routing path instead of the called party address and sending out a message packet onto the acquired VC connected thereby, but delivering, when no information is detected in the table, a signaling request for transmission of the next packet to the packet switch.

It is a fourth object of the present invention to achieve an increase in speed upon transmission by allocating an unused VC to a transmission terminal in advance. In order to attain this object, according to the present invention, there is provided a signaling method for VC connection setup/release on a connection oriented packet network in which each terminal acquires the VC to transmit a packet to a packet switch and the packet switch sets up a VC having a signal bandwidth corresponding to the request for transmission of the packet and notifies the terminal of the VCI, the signaling method comprising the steps of:

allocating, at the packet switch, to an input port of the packet switch, a number of free VCs for each output port as a high speed mode VC;

allocating, at each terminal, free VCs to an input port of the packet switch as a high speed mode VC;

selecting, when a terminal tries to send a packet, a VC applied as the high speed mode VC instead of acquiring it from the packet switch and performing signaling with the specified VC number of the high speed mode VC and a called party address on a signaling packet to the packet switch;

discriminating, in the packet switch, an output port according to the called party address of the received signaling packet, and allocating an appropriate VC and forwarding the packet to the output port; and thereafter renewing the VCs relationship table between input and output ports.

Meanwhile, the called party address to be placed in the signaling packet in the signaling method for the packet network of the fourth object of the present invention described above may be replaced with the source routing path, which shows the path from the source terminal to the destination terminal, recited in the signaling system for the network of the third object of the present invention.

It is a fifth object of the present invention to provide a signaling system for a packet network for realizing the method of the fourth object.

In order to attain this object, according to the present invention, there is provided a signaling system for VC connection setup/release on a connection oriented packet network in which each terminal acquires the VC to transmit a packet to a packet switch, and the packet switch sets up a VC having a signal bandwidth corresponding to the request for transmission and notifies the terminal of the VCI, the signaling system comprising:

the packet switch including means for renewably allocating, to an input port of the packet switch, some free VCs for each output port as high speed mode VCs;

a free VC table which is existing on each input port for a high speed mode, where the output port number and the free VCs allocated to the output port are registered for high speed mode signaling;

a header translator table for indicating mode information representative of whether information received at the input port of the packet switch is a high speed mode or an ordinary signaling mode, information representative of a virtual channel identifier (VCI), and an output port number and output port information as VCI information at the output port number;

each terminal including a VC and mode table indicating called party addresses, VCs corresponding to the addresses held for a predetermined period of time after the end of the transmission through the VC;

a free VC table on the terminal for a high speed mode VC in which free channels of links to the input port of the packet switch are renewably allocated;

means for searching, when a packet is to be sent out, the VC and mode table for a VC to a called party address and sending out a message packet through the VC, when the VC is detected, and when the VC is not detected, performing the signaling with the appropriate VCI picked up from the free VCI table and the called party address on a signaling packet to the packet switch; and the packet switch further including means for discriminating an output port in response to the called party address of the received signaling packet, acquiring free high speed mode VC allocated to the output port and forwarding the signaling packet, and then renewing the VC table of the input and output ports.

DESCRIPTION OF THE DRAWINGS

FIG. 4 is a diagrammatic view illustrating a method of representing a source route of the signaling packet shown in FIG. 3.

DESCRIPTION OF THE PREFERRED EMBODIMENTS

In the following, the present invention is described in detail with reference to the drawings. First, a signaling system for connection and disconnection of a virtual channel (VC) with less overhead procedure without a connecting of permanent virtual channel (PVC) is described with reference to its block diagram and sequence chart. Second, another signaling system which reduces route selection processing is described with reference to its block diagram. Third, a further signaling system in which a terminal determines free VCs is described with reference to its block diagram. Finally, a system wherein the signaling system which determines free VCs and the signaling system which reduces the route selection processing are combined with each other is described.

Figure 1:
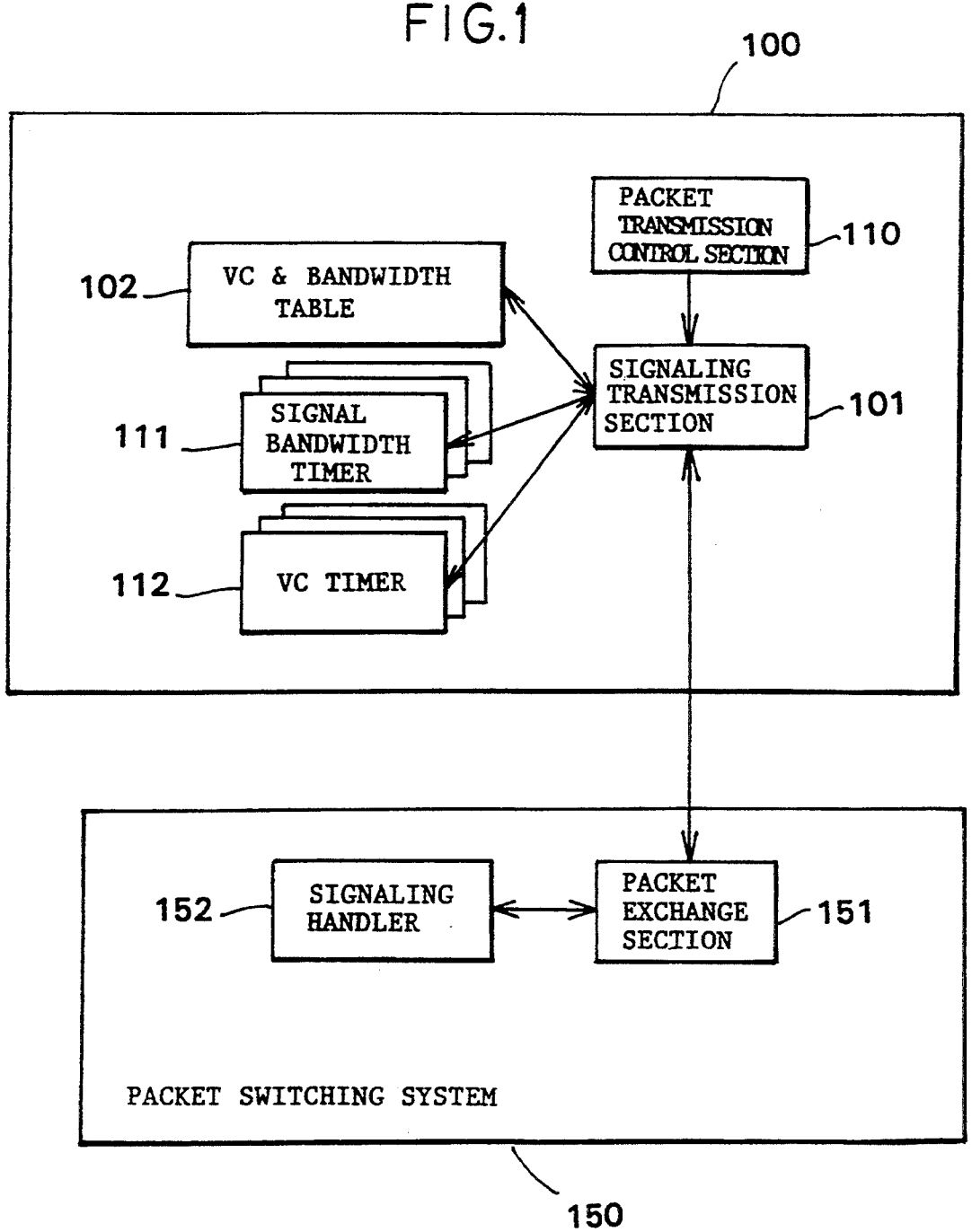
FIG. 1 is a block diagram of a first embodiment of a signaling system for the packet network of the present invention.

FIG. 1 is a block diagram showing a first embodiment of a signaling system for a packet network to which the first signaling method for the packet network of the present invention is applied.

Each terminal 100 includes virtual channel (VC) timers 112, signal bandwidth timers 111 for dynamically varying the signal bandwidth held on VC and signal bandwidth table 102, packet transmission control section 110, and signaling transmission section 101.

Separately, packet 150 includes packet exchange section 151, and signaling handler 152.

The signaling system of the present embodiment adopts the following controlling procedure in FIG. 1.

When terminal 100 transmits a packet, packet transmission control section 110 delivers a request for transmission of the packet to signaling transmission section 101. Signaling transmission section 101 refers to VC and signal bandwidth table 102 and performs one of operations (a1), (b1), or (c1) below in response to the condition of the table.

(a1) If a VC corresponding to the called party address and a signal bandwidth necessary for communication are written in table 102, the packet is transmitted through the VC.

(b1) If a corresponding VC is held but a signal bandwidth necessary for communication is not provided in table 102, an allocation request for the signal bandwidth is delivered to packet switching system (packet switch) 150 in accordance with the conventional signaling method. In packet switch 150, packet exchange section 151 detects that the packet is a signaling packet and delivers the packet to signaling handler 152. Signaling handler 152 reallocates the requested amount of signal bandwidth in the VC between terminal 100 and packet switch 150 and returns its reply to signaling transmission section 101 by way of packet exchange section 151. In response to the reply, signaling transmission section 101 describes the corresponding relationship between the VC and the signal bandwidth into VC & signal bandwidth table 102. After completion of the description, packet transmission control section 110 transmits the packet to the called party through the allocated VC to packet switch 150.

(c1) If no corresponding VC and no signal bandwidth necessary for communication remain in table 102, an allocation request (signalling packet) for a VC with the necessary signal bandwidth is delivered to packet switch 150 in accordance with a signaling method similar to that in operation (b1), and signaling handler 152 in packet switch 150 reallocates a free VC with the necessary signal bandwidth in the VC between terminal 100 and packet switch 150. Then, the corresponding relationship of the called party address to the thus allocated VC and the signal bandwidth is described into VC & signal bandwidth table 102. After completion of the description, packet transmission control section 110 transmits the packet to the called party through the allocated VC to packet switch 150.

Further, table 102 has VC timer 112 and signal bandwidth timer 111 for each destination address and resets and restarts both timers for each transmision of a packet. Accordingly, the values of both timers represent intervals from the end of transmission of the last packet.

When an interval passes a first predetermined time accoridng to signal bandwidth timer 111, signaling transmission section 101 starts to deliver a request to decrease the signal bandwidth to packet switch 150. Signalling handler 152 in packet switch 150 reallocates the shorter signal bandwidth and rewrites the allocated amount of VC & signal bandwidth table 102 together with a reply to signaling control section 101. When a predetermined limit of time has passed by signal bandwidth timer 111, signaling transmission section 101 delivers a request to reduce the bandwidth to 0 to packet switch 150, and the allocated signal bandwidth amount of VC & signal band table 102 is re-written to zero by way of a procedure similar to that described above.

Separately, in this instance, since VC timer 112 is set longer than signal bandwidth timer 111, even after signal bandwidth timer 111 passes the predetermined limit of time, the VC remains connected. When further time passes until the predetermined limit of VC timer 112, signaling transmission section 101 delivers a request to disconnect the VC (release packet) to packet switch 150, and consequently, the corresponding VC and the signal bandwidth are deleted from VC & signal bandwidth table 102 and the VC is disconnected by way of a procedure similar to that described above.

Accordingly, when communication of an application having the same destination address or the same service is resumed, one of the signaling methods (a2), (b2), or (c2) below is performed in accordance with the timer values of VC timer 112 and signal bandwidth timer 111.

(a2) When both VC timer 112 and signal bandwidth timer 111 count the time without reducing the signal bandwidth, the held VC should be used to start communication without signaling. If no signal bandwidth necessary for the application is provided, signaling is performed to only request a signal bandwidth in accordance with signaling method (b1) described above.

(b2) If VC timer 112 is on before the predetermined limit of time but the necessary signal bandwidth is less than the required signal bandwidth, signaling is performed by requesting only the signal bandwidth in accordance with signaling method (b1) described above.

(c2) When both VC timer 112 and signal bandwidth timer 111 pass the predetermined limit of time, signaling is performed to request both a VC and a signal bandwidth in accordance with signaling method (c1) described above.

Figure 2:
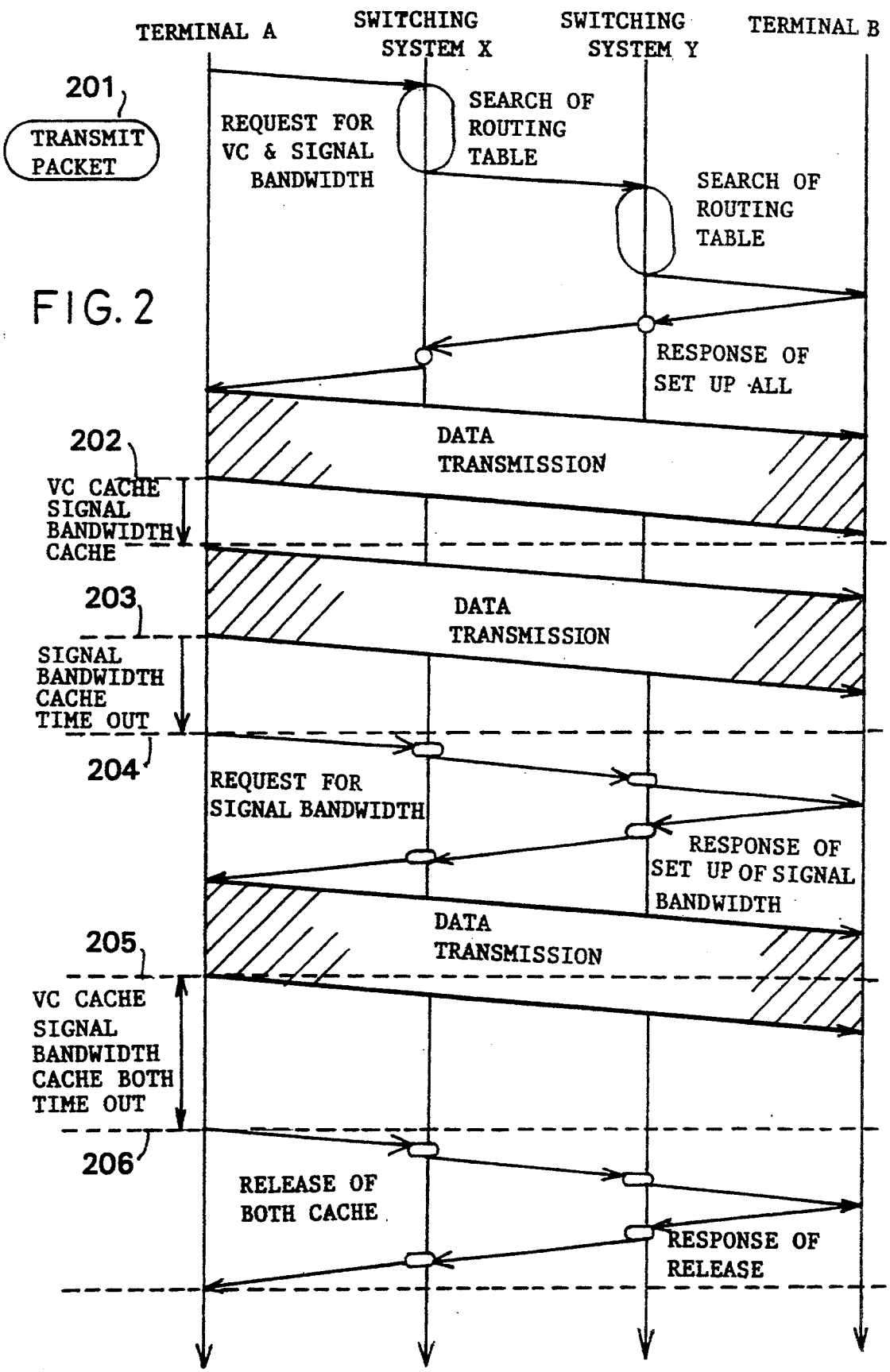
FIG. 2 is a sequence chart of the signaling system in the system shown in FIG. 1.

The signaling procedure between terminal 100 and packet switch 150 described above with reference to FIG. 1 relates to FIG. 2 which sequentially illustrates signaling between two packet switches together with signaling between a terminal and a packet switch. FIG. 2 shows an example wherein a VC and a signal bandwidth are not yet allocated to a called party address.

When a packet is to be transmitted as shown at step 201, since no VC with the required signal bandwidth to the called party address is detected in the VC & signal bandwidth table, a signaling packet is delivered from terminal A to packet switch X in accordance with the system shown in FIG. 1.

Data transmission is performed as shown at step 202 through the VC and the signal bandwidth assigned by the conventional signaling method wherein a routing table search is performed in a hop-by-hop mode at packet switches X and Y according to the signaling packet. After data transmission at step 202 is completed, data transmission can be performed without signaling as seen from step 203 before the time limit of both the VC timer and the signal bandwidth timer. When the signal bandwidth timer has passed the time limit, signaling to request only a signal bandwidth is performed in a hop-by-hop mode as shown at step 204, and then data transmission is performed as shown at step 205. When both the VC timer and the signal bandwidth timer have passed their time limits, terminal A transmits a release packet to packet switch X requesting release of the VC as shown at step 206. In this manner, according to the present signaling system, neither the VC nor the signal bandwidth is released immediately after communication is completed but is held for a short period in order to reduce the overhead of signalling as much as possible.

Figure 3:
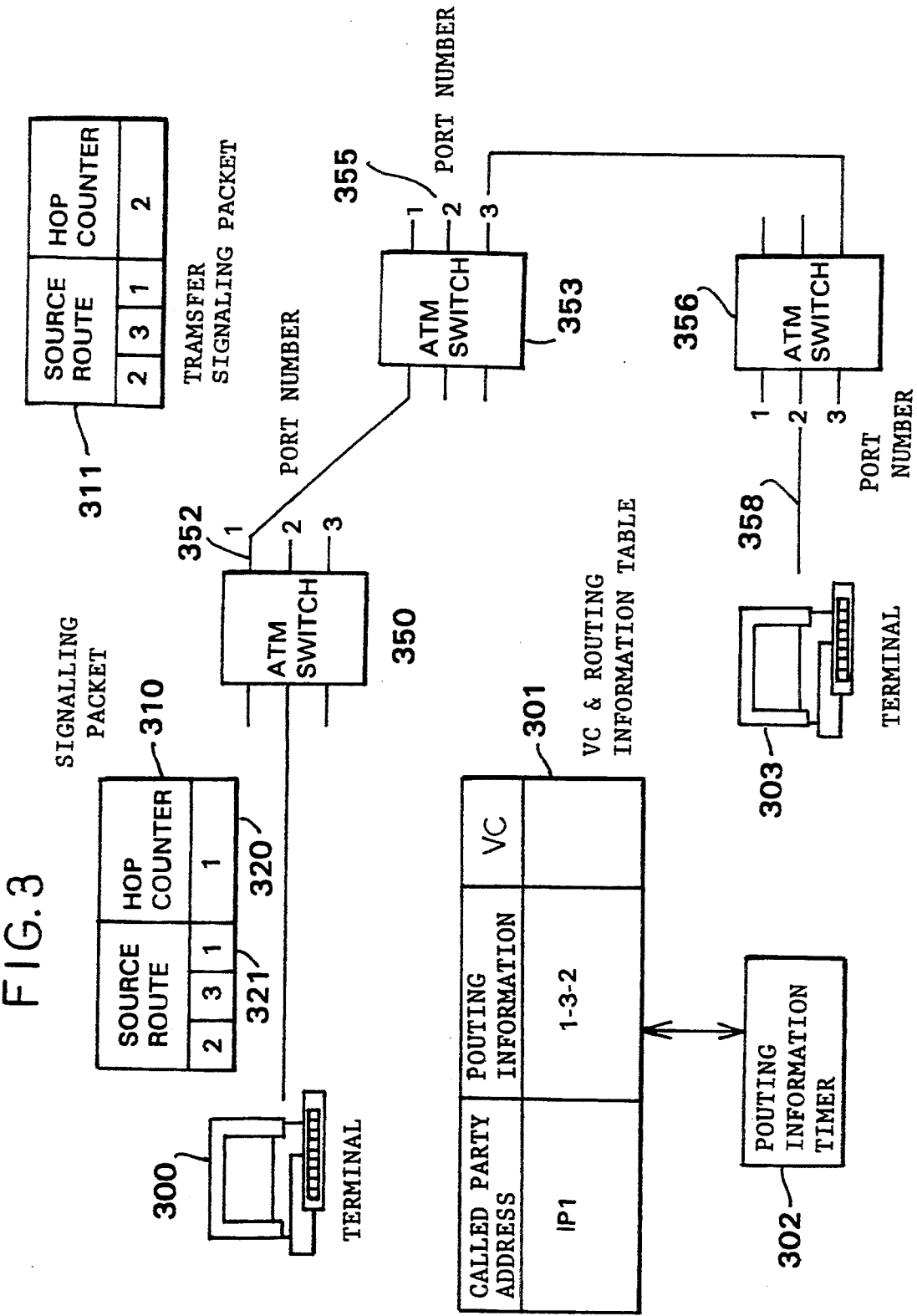
FIG. 3 is a block diagram of a second embodiment of a signaling system for the packet network of the present invention.

FIG. 3 is a block diagram showing a second embodiment of a signaling system for a packet network to which the second signaling method for the packet network of the present invention is applied. Describing operation of the signaling system of the present embodiment, when a route is searched upon signaling, a physical port number is designated directly without searching a route based on the called party address, while allocation of a VC and a signal bandwidth at each link is based on the same controlling procedure as in the conventional hop-by-hop signaling system. The routing procedure in the present signaling system is concretely performed as follows referring to FIG. 3.

When terminal 300 transmitting a packet to terminal 303 having a called party address of IP1 is described, terminal 300 searches VC and routing information table 301 and performs one of operations (a), (b), or (c) below in response to the content of the table.

(a) If a VC corresponding to called party address IP1 is written in VC & routing information table 301, this signifies that a VC has already been set to the called party, and a packet is transmitted through the VC.

(b) If no VC corresponding to the called party address and no routing information are written in table 301, hop-by-hop routing based on the conventional signaling method is performed to set a VC with the required signal bandwidth for each link between the terminal and a packet switch and between packet switches, and simultaneously, a reply information (linkage information of output port information) of ports of packet switches 350, 353, and 356 on a route from terminal 300 to terminal 303, the route which passes (for example, port 1 (352), port 3 (353), and port 2 (358)) is provided to terminal 300 so that the information is written into the routing information area of VC & routing information table 301. After completion of the writing, terminal 300 transmits the packet to terminal 303 through the VC allocated. Information of which ports of each packet switch on the route are connected can be obtained by a plurality of methods. For example, a method wherein signaling is performed, upon hop-by-hop signaling, adding output port information to the original signaling information and providing the routing information to terminal 300 from destination terminal 303, and another method wherein, when a confirmation response is received from each relay packet switch to terminal 300, all output port information is included.

(c) If no VC corresponding to the called party address is written but routing information is written in VC & routing information table 301, route information is designated at a high speed by sending out signaling packet 310 including a setup message for signaling. Signaling packet 310, including the setup message for signaling such as HOP counter 320 and linkage information 321 (source routing information) which has been acquired as described in (b) above, successively links output port information of the relay switches. Terminal 300 sends out signaling packet 310 of a signaling message wherein the value of HOP counter 320 is set to 1 and the route information written in table 301 is placed in the section denoted at 321. Upon receiving the message, switch 350 recognizes that the first route is port 1 (352) which is indicated by HOP counter value 1 in the message of signaling packet 310 and represents the first port number from the right. Simultaneously, the HOP counter value of message 310 adds one, and transfer signaling packet 311 is transferred from output port 352 of packet switch 350. Similarly, it is known to switch 353 that, from HOP counter value 2 of message 311, the next route is port 2 (355) of the second output port number of 3 from the right, and it is known to switch 356 that the last route is port 358 of the third port number of 2 from the right. Thus, each of packet switches 353 and 356 allocates a VC which requires a signal bandwidth for each route. After completion of the signaling described above, terminal 300 transmits a packet through the VC allocated to terminal 303.

In this instance, the following three techniques are available to place the source routing information in a signaling packet, including a method wherein a HOP counter in which the number of passed packet switches is recorded and port numbers interconnecting route information are placed as seen from format 401 in FIG. 4 (various positions may be possible for the HOP counter and the route information), another method wherein both a switch number and a port number are linked as seen from format 402, and a further method wherein port numbers are rotated each for passage of packet switches so that an output port may always be positioned at a fixed position in the link list as seen from format 403.

Further, the routing information in table 301 has routing information timer 302 for each destination address, and each time a packet to a particular called party address is dialed, the routing information timer for the called party address is reset and restarted. Accordingly, the value of the timer represents an interval of time which passes after the end of a packet transmission. When routing information timer 302 exceeds its predetermined time, only the routing information written on table 301 is erased.

Accordingly, when routing information is not available, conventional signaling is performed and routing information is simultaneously acquired, but when routing information is available, the routing information can be allocated immediately by source routing.

Figure 5:
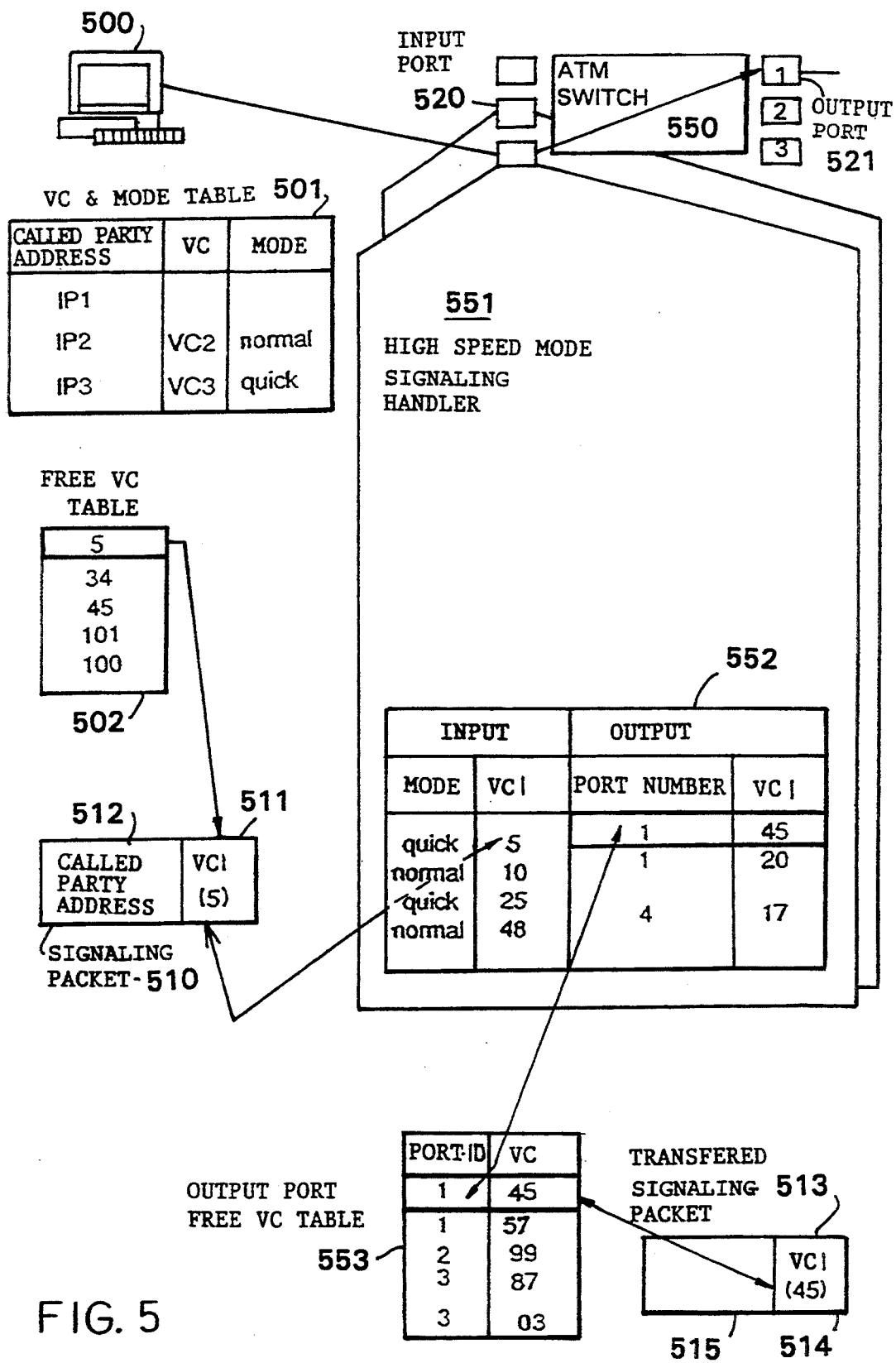
FIG. 5 is a block diagram of a third embodiment of a signaling system for the packet network of the present invention.

FIG. 5 is a block constructive view showing a third embodiment of the signaling system for a packet network to which the third signaling method for the packet network of the present invention is applied. Describing operation of the signaling system of the present embodiment, a free VC is allocated to a terminal and a packet switch in advance so that a signaling packet can set a VC by selecting a free VC. Consequently, a packet can be sent out immediately after the signaling packet is sent out. The route control in the signaling system of the present embodiment concretely follows the following procedure shown by the arrows in FIG. 5. Free VCs at the output ports of packet switch 550 are allocated as input ports in advance (when the other party of the output port is a terminal, a free VC at the output port of the packet switch is used), and the output port number and the free VC at the output port are written for high speed mode signaling in free VC table 553 as an output port. Separately, also on the terminal 500 side, unused VCs of the links to input port 520 of switch 550 are allocated and written into output port Free VC table 502 for a high speed mode.

When terminal 500 transmits a packet, the following two controlling procedures are executed depending on the content of VC and mode table 501.

(a) When a VC to a called party address (for example, IP1 to IP3) exists in VC and mode table 501, this signifies that a VC has already been set, and a packet is transmitted without signaling.

(b) When a VC to the called party address is not present in VC and mode table 501, an arbitrary VC is acquired from Free VC table 502 for a high speed mode and signaling packet 510 is transmitted. A data packet may be transmitted simultaneously. Signaling packet 510 includes VC field 511 into which a VC identifier allocated to the terminal is arbitrarily placed and destination terminal address 512. Packet switch 550 compares VC field 511 in received signaling packet 510 with header translator table 552, and when it is confirmed that the mode field represents a high speed mode (quick) and the port number on the output port side and the VC corresponding to it are not yet decided, packet switch 550 interprets that the packet is a signaling packet. In the header translator table, mode information as to whether the mode is a high speed mode (quick) or an ordinary signaling mode, information of VC identifiers (VCIs) and information of output port numbers and VCIs at the port numbers are written as information of the output ports. When a signaling packet is received, switch 550 refers to destination address 512 of the signaling packet to determine to which port it should output, and arbitrarily selects a free VC for a high speed mode of the output port from output port Free VC table 553 for an output port. Simultaneously, the relationship between the port number (1) of the output and the VCI (45) corresponding to the VCI (5) of the input port of header translator table 552 is rewritten. Thereafter, the thus selected VCI (45) is written into VCI field 514 to make transfer signaling packet 513, and transfer signaling packet 513 is outputted from output port 521.

In this instance, the VC used is deleted from high speed mode free VC table 502 on the terminal side and from output port free VC table 553.

Here, as a technique of discriminating whether a packet is a signaling packet or not, a method wherein a flag representing whether the packet is a data packet or a signaling packet is placed in advance in the header of the packet is available.

When a VC is released after communication is completed or a timer for each destination address counts the predetermined limit of time after it is reset and restarted for each packet transmission, the value of the mode of VC and mode table 501 is referred to, and if the mode is a high speed mode (quick), the VC is deleted from table 501 but is added to high speed mode free VC table 502. When a signaling packet to release the VC is received, the corresponding portions of the output port and the VCI of header translator table 552 are deleted at input port 520 on the switch 550 side while the port number and the VC are added to output port free VC table 553. The procedure for transferring the signaling packet for releasing the VC by a packet switch is the same as the procedure for setting up the VC.

In accordance with an embodiment of the invention, the routing information may be used in place of the network address information. Routing information to a called party address is further included in VC and mode table 501 shown in FIG. 5 and a timer is prepared for the routing information. When a packet is transmitted, inputted called party address 512 is converted into routing information to effect high speed signaling. When signaling packet 510 having routing information is received, high speed mode signaling handler 551 is required only to select a written output port when an output port should be discriminated. Consequently, routing for a signaling packet to an output port can be achieved at a high speed. In signaling with a called party address included in signaling packet 510, the present technique is very simple in processing compared with the alternative technique wherein, upon routing for a signaling packet, each packet switch determines an output port to be routed based on a routing table provided in advance in the switch. Accordingly, hardware construction can be realized readily and is suitable for high speed operation.

What is claimed is:

1. A signaling system for virtual channel connection setup/release on a connection oriented packet network in which each terminal acquires a virtual channel as a held virtual channel to transmit to a packet switching system and said packet switching system sets up a virtual channel having a signal bandwidth corresponding to a request for transmission of the packet and provides a virtual channel identifier to the terminal, said signaling system comprising:

each terminal including a virtual channel disconnection timer for disconnecting the virtual channel provided to the terminal after a predetermined period of time after the end of transmission of the packet through the virtual channel;

a signal bandwidth timer for successively decreasing the signal bandwidth on the held virtual channel as the unused time duration of the held virtual channel increases;

a virtual channel holding and indicating table for recording the held virtual channel provided thereto during each holding time;

means for searching, when a packet transmission is required, said table for the virtual channel and transmitting, when it is confirmed that the virtual channel to a called party terminal has a necessary signal bandwidth, the packet through the virtual channel;

means for performing, when the search reveals that the virtual channel to the called party terminal is held but a necessary signal bandwidth is not held, signaling to provide a request to said packet switching system to provide the necessary signal bandwidth only; and means for performing, when the search reveals that no virtual channel to the same called party terminal is detected, signaling to provide a request to said packet switching system to provide both the necessary virtual channel and signal bandwidth.

2. A signaling system for virtual channel connection setup/release of a connection oriented packet network in which each terminal acquires a virtual channel to transmit a packet to a packet switching system and said packet switching system sets up a virtual channel having a signal bandwidth corresponding to a request for transmission of the packet and provides a virtual channel identifier to the terminal, said signaling system comprising:

said packet switching system including means for notifying said terminal, when signaling to request transmission of a packet is received, a routing path from a source terminal to a called party terminal by performing a hop-by-hop route search using an address of the called party terminal included in the signaling from the terminal;

each terminal comprising a virtual channel and routing information table for indicating a virtual channel to a called party address already assigned or routing information of an assigned virtual channel which is held for a predetermined period of time after completion of a transmission of the packet through the virtual channel;

each terminal further comprising means for searching, when a packet is to be transmitted, said virtual channel and routing information table, means for sending out the packet through the existing virtual channel when a virtual channel to the called party address is detected, means for performing signaling by including routing path information to a called party terminal in addition to the called party address when the virtual channel is not existing but the routing path information to the called party terminal is detected, means for sending out a message packet through the acquired virtual channel and means for performing signaling with only a called party address without any routing path information, when no information is detected in the table, as a signaling request for transmission of a packet to said packet switching system.

3. A signaling method for virtual channel connection setup/release on a connection oriented packet network in which each terminal acquires a virtual channel to transmit a packet to a packet switching system and said packet switching system sets up a virtual channel having a signal bandwidth corresponding to a request for transmission of a packet and provides a virtual channel identifier to the terminal, said signaling method comprising the steps of:

allocating, at said packet switching system, to an input port of said packet switch, a number of free virtual channels for each output port as high speed mode virtual channels;

allocating, at each terminal, free virtual channels to the input port of said packet switching system as a high speed mode virtual channel;

selecting, when a terminal tries to send a packet, a virtual channel applied as the high speed mode virtual channel instead of acquiring it from the switching system and performing signaling with a selected virtual channel number of the high speed mode virtual channel from the allocated free virtual channels and a called party address on a signaling packet to said packet switching system;

discriminating, in the packet switching system, an output port according to the called party address of the received signaling packet, and allocating an appropriate virtual channel and forwarding the signaling packet to the output port; and thereafter renewing the virtual channels in the input and output ports and renewing a relationship between the virtual channels in the input and output ports.

4. A signaling method for a connection oriented packet network as claimed in claim 3, wherein the called party address to be placed in the signaling packet is replaced with the source routing path obtained through a hop by hop route search using the address of a called party terminal by the packet switching system responding to a request for transmission.

5. A signaling system for virtual channel connection setup/release on a connection oriented packet network in which each terminal acquires a virtual channel to transmit a packet to a packet switching system and said packet switching system sets up a virtual channel having a signal bandwidth corresponding to a request for transmission of a packet and providing a virtual channel identifier to the terminal, the signaling system comprising:

said packet switching system including:

a free virtual channel table at each input port of the packet switching system;

means for renewably allocating, to a free virtual channel table at an input port of the packet switching system, some free virtual channels for each output port as high speed mode virtual channels;

each free virtual channel table being located at each input port of the packet switching system being used for a high speed mode signaling on which an output port number and the free virtual channels allocated to the output port are registered; and a header translator table, which is located at an input port of the packet switching system and facilitates a fast packet routing only in hardware, for indicating whether information received at the input port of aid packet switching system is a high speed mode or an ordinary signaling mode, and for indicating a relationship among input virtual channel identifier (VCI) output port numbers, and output port information as the virtual channel identifier (VCI); and each terminal including:

a virtual channel and mode table indicating called party addresses, virtual channels corresponding to the addresses, and a timeout value showing a predetermined period of time after the end of a transmission of packets through the virtual channel;

a free virtual channel table for a high speed mode virtual channel in which free virtual channels of links to the input port of said packet switching system are renewably allocated; and means for searching, when a packet is to be sent out, said virtual channel and mode table for a virtual channel to a called party address and sending out a message packet through the virtual channel when the virtual channel is detected on the table, and when the virtual channel is not detected on the table, performing signaling with a high speed mode virtual channel identifier picked up from a free virtual channel identifier table, a calling party address and a called party address on a signaling packet to said packet switching system; and said packet switching system including means for discriminating an output port in response to the called party address content of the received signaling packet, acquiring the free high speed mode virtual channel allocated to the output port and forwarding the signaling packet, and then renewing a header translator table at an input port for fast packet routing.

* * * * *